United States Patent
Iwasaki et al.

(10) Patent No.: US 6,381,034 B2
(45) Date of Patent: *Apr. 30, 2002

(54) IMAGE PROCESS APPARATUS, IMAGE PROCESS METHOD AND STORAGE MEDIUM

(75) Inventors: Osamu Iwasaki, Tokyo; Naoji Otsuka, Yokohama; Kiichiro Takahashi, Kawasaki; Hitoshi Nishikori, Inagi, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/883,572

(22) Filed: Jun. 26, 1997

(30) Foreign Application Priority Data

Jun. 28, 1996 (JP) .............................. 8-169328

(51) Int. Cl.$^7$ .............................. G06F 15/00
(52) U.S. Cl. ........................ 358/1.9; 358/515; 358/518; 382/167
(58) Field of Search .................. 395/109; 358/518, 358/528, 520, 529, 530, 538, 1.9, 515–519; 382/162–167

(56) References Cited

U.S. PATENT DOCUMENTS

| | | | |
|---|---|---|---|
| 4,985,759 A | 1/1991 | Ito | 358/79 |
| 4,989,079 A | 1/1991 | Ito | 358/80 |
| 5,386,305 A | 1/1995 | Usami | 358/518 |
| 5,446,476 A | 8/1995 | Kouzaki | 347/232 |
| 5,724,440 A | * 3/1998 | Funada et al. | 382/162 |
| 5,729,360 A | 3/1998 | Kita et al. | 358/500 |
| 5,768,403 A | * 6/1998 | Suzuki et al. | 382/165 |
| 5,841,897 A | * 11/1998 | Numakura et al. | 382/163 |
| 5,847,729 A | * 12/1998 | Takahashi et al. | 347/43 |

FOREIGN PATENT DOCUMENTS

| | | | |
|---|---|---|---|
| EP | 0317268 | 5/1989 | H04N/1/40 |
| EP | 0696866 | 2/1996 | H04N/1/60 |
| JP | 62-293793 | 12/1987 | G01R/31/02 |
| JP | 07212583 | 8/1995 | H04N/1/40 |

* cited by examiner

Primary Examiner—Joseph Mancuso
Assistant Examiner—Douglas Tran
(74) Attorney, Agent, or Firm—Fitzpatrick, Cella, Harper & Scinto

(57) ABSTRACT

An image processor in which an under color process is performed according to a color region to which input color image data belongs. The under color process generates a plurality of color component signals including a black component signal including a black component signal, with the color region being defined by hue. Therefore, even if input color image data includes color components other than an under color component, tonality (i.e., linearity between an input color value and an output color value) is compensated for.

13 Claims, 11 Drawing Sheets

IMAGE PROCESS APPARATUS, IMAGE PROCESS METHOD AND STORAGE MEDIUM

BACKGROUND OF THE INVENTION

1. Field of the Invention

The present invention relates to an image process apparatus and method which perform an under color removal process for inputted image data.

2. Related Background Art

In recent years, color printers applying various recording systems have been developed as output apparatuses for a color image. In these printers, an ink-jet recording apparatus has been widely used, because such apparatus has many advantages. That is, the ink-jet recording apparatus can be manufactured at low cost, can print a high-quality image on various kinds of recording media, can easily be made compact in size, and the like.

Numbers of image data which are outputted by such color printer frequently correspond to an output apparatus which utilizes a light emission element such as a CRT (cathode-ray tube) monitor or the like. Therefore, such image data are composed of R (red), G (green) and B (blue) signals.

The color printer converts such RGB signals into C (cyan), M (magenta) and Y (yellow) signals or C (cyan), M (magenta), Y (yellow) and K (black) signals, by using an image process means. An image process method which is performed by such image process means has been proposed as U.S. patent application Ser. No. 08/711,953 filed on Sep. 6, 1996, by the same applicant as that of the present application.

FIG. 8 is block diagram for explaining a concept of such image process method proposed by the same applicant as that of the present application.

It is assumed that the image data consists of eight bits for each of RGB colors, and "eight bits" in the present application represents integers from 0 to 255.

The image data is inputted into an image input means 20001 and then R, G and B data each consisting of eight bits are transferred to a luminance and density conversion means 20002. The luminance and density conversion means 20002 performs a luminance and density converting process on the R, G and B data to convert these data into C, M and Y data each consisting of eight bits.

Subsequently, a black component generation means 20003 generates a black component K on the basis of minimum values of the C, M and Y data. If it is assumed that a function to be used for calculating the minimum value is min( ), C1, M1, Y1 and K1 data each consisting of eight bits and outputted from the black component generation means 20003 are obtained by the following equations.

C1=C

M1=M

Y1=Y

K1=min(C, M, Y)

Subsequently, a masking means 20004 performs a masking process on the C1, M1, Y1 and K1 data to output C2, M2 and Y2 data.

Subsequently, an under color component separation means 20005 performs a process on the basis of following equations, to output C3, M3, Y3 and U data.

U=min(C2, M2, Y2)

C3=C2−U

M3=M2−U

Y3=Y2−U

Subsequently, an under color process means 20100 generates C4, M4, Y4 and K4 data each consisting of eight bits, on the basis of the under color component data U. The under color process means 20100 is composed of a black component generation means 20006, a cyan component generation means 20007, a magenta component generation means 20008 and a yellow component generation means 20009, and thus generates the C4, M4, Y4 and K4 data each consisting of eight bits by using functions KGR( ), CGR( ), MGR( ) and YGR( ) shown in FIG. 9. That is, the following relation is satisfied.

C4=CGR(U)

M4=MGR(U)

Y4=YGR(U)

K4=KGR(U)

Subsequently, the C3, M3 and Y3 data outputted from the under color component separation means 20005 and the C4, M4 and Y4 data outputted from the under color process means 20100 are respectively synthesized by a cyan component output means 20011, a magenta component output means 20012 and a yellow component output means 20013, to respectively generate C6, M6 and Y6 data. Such processes are performed on the basis of following equations.

C6=C3+C4

M6=M3+M4

Y6=Y3+Y4

In this case, if values of the C6, M6 and Y6 data are equal to or smaller than "0", such values are determined as "0". On the other hand, if these values are equal to or larger than "256", such values are determined as "255". On the basis of the C6, M6, Y6 and K4 data outputted through such processes, an output gamma correction means 20101 respectively output C7, M7, Y7 and K7 data each consisting of eight bits. The output gamma correction means 20101 is composed of a black output gamma correction means 20014, a cyan output gamma correction means 20015, a magenta output gamma correction means 20016 and a yellow output gamma correction means 20017, and calculates the following equations by using functions KGAM( ), CGAM( ), MGAM( ) and YGAM( ).

C7=CGAM(C6)

M7=MGAM(M6)

Y7=YGAM(Y6)

K7=KGAM(K4)

The output gamma correction means performs the conversion to linearize the relation between the inputted values (i.e., C6, M6, Y6 and K4 data) and optical reflection densities of printed or outputted results. Ordinarily, each of the functions KGAM( ), CGAM( ), MGAM( ) and YGAM( ) shown in FIG. 10 consists of 256 reference tables.

The functions CGR( ), MGR( ), YGR( ) and KGR( ) are set such that, in a case where the inputted image data satisfy the equations R=G=B, the printed results are obtained by an achromatic color. That is, such functions have structure for compensating for that, in a case where the image data represents gray scale, the printed result is also represented by the gray scale.

However, in such image process method, in a case where the inputted image data includes a color component other than the under color, there has been a problem that tonality or gradient (i.e., linearity between the inputted value and the outputted result) can not be compensated.

FIG. 11 is a view showing the relation between a blue signal (B) and an optical reflection density in the conventional image process apparatus.

In this case, the blue signal (B) has a value which represents blue components in the inputted C2, M2 and Y2 data (satisfying C2 =M2 and min(C2, M2, Y2)=Y2), and can be obtained by the following equation.

$$B=C2-Y2$$

In FIG. 11, it can be understood that, in respect of cyan (C), the optical reflection density of a blue signal 127 is lower than that of a blue signal 255. That is, the tonality in blue is not compensated. Especially, as the color component other than the achromatic color becomes large, i.e., as the inputted image becomes vivid, the tonality becomes.

Such a tendency is remarkable in an ink-jet record system. That is, in recording dot groups which represent a paper surface and an achromatic component (i.e., background color) by the gray scale, in a case where the recording dot groups are recorded such that the group representing the achromatic color component comes into contact with or overlaps the group representing the color component other than the achromatic color component on condition that the gray scale is optically compensated, such tendency is remarkable because the ink-jet record system changes the structure of a dye or a pigment on a surface of a recording medium.

SUMMARY OF THE INVENTION

An object of the present invention is to provide image process apparatus and method which compensate for tonality or gradient even in a case where a color component other than an under color component is included in input image data.

In consideration of a fact that the above-described tendency is remarkably seen in a blue region, an another object of the present invention is to compensate for the tonality especially in the blue region.

In order to achieve the above objects, an image process method is provided comprising:
an input step of inputting image data; and
an under color process step of performing an under color process according to a color region to which the image data belongs, to generate a plurality of component signals including a black component signal,
wherein the color region is defined by hue.

Further, an image process method is provided comprising:
an input step of inputting image data;
a judgment step of judging a color region of the image data; and
an under color process step of performing an under color process according to the color region,
wherein, in the under color process step, a blue region is subjected to the under color process which is different from the under color process for other color regions.

Furthermore, an image process method is provided comprising:
an input step of inputting image data;
a judgment step of judging a color region of the image data; and
an under color process step of performing an under color process according to the color region,
wherein the under color process step selectively performs a first under color process or a second under color process in accordance with the color region judged in the judgment step, in the first under color process a black component is not added to a vivid portion, and in the second under color process the black component is added to the vivid portion.

The above and other objects of the present invention will become apparent from the following detailed description when read in conjunction with the accompanying drawings.

DETAILED DESCRIPTION OF THE PREFERRED EMBODIMENTS

Figure 1:
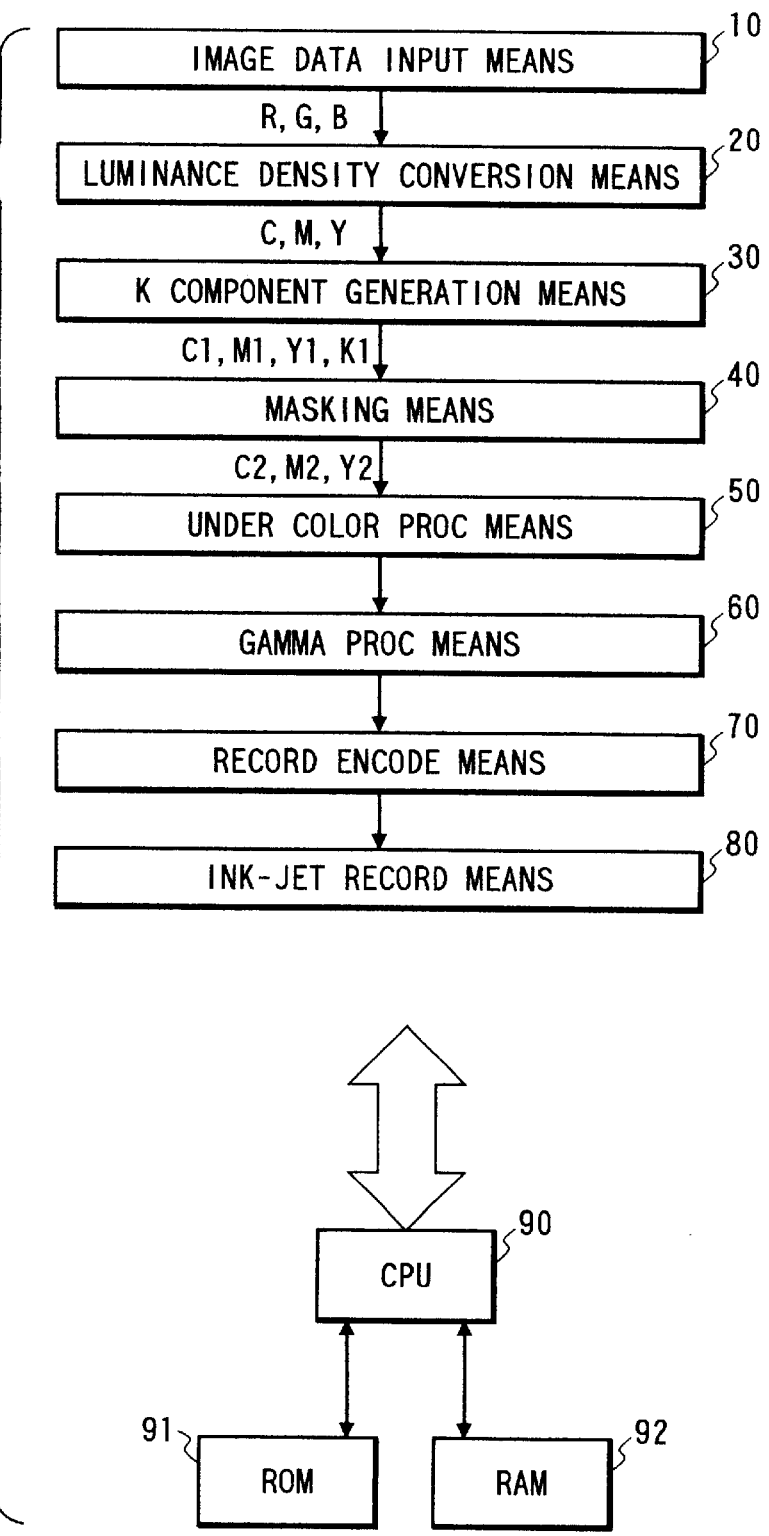
FIG. 1 is a block diagram showing an example of the structure of an image process apparatus according to the present invention.

FIG. 1 is a block diagram showing an example of the structure of an image process apparatus according to the present invention.

In the present invention, it is assumed that image data consists of eight bits for each of RGB colors, and "eight bits" represents integers from 0 to 255.

The image data is inputted into an image input means 10, and then R, G and B data each consisting of eight bits are transferred to a luminance and density conversion means 20. The luminance and density conversion means 20 converts the R, G and B data into C, M and Y data each consisting of eight bits, by using a function BTD( ) in the following equations.

$$C=BTD(R)$$
$$M=BTD(G)$$
$$Y=BTD(B)$$

Subsequently, a black component generation means 30 generates a black component K on the basis of minimum values of the C, M and Y data. If it is assumed that a function to be used for calculating the minimum value is min( ), C1, M1, Y1 and K1 data each consisting of eight bits and outputted from the black component generation means 30 are obtained by the following equations.

$$C1=C$$
$$M1=M$$
$$Y1=Y$$
$$K1=\min(C, M, Y)$$

Then, a masking means 40 adjusts a tint by performing a matrix calculation based on the following equations.

$$C2 = a11 \times C1 + a12 \times M1 + a13 \times Y1 + a14 \times K1$$

$$M2 = a21 \times C1 + a22 \times M1 + a23 \times Y1 + a24 \times K1$$

$$Y2 = a31 \times C1 + a32 \times M1 + a33 \times Y1 + a34 \times K1$$

In this case, numerals between "0.9" and "1.3" are generally used as the values a11, a22 and a33, and numerals between "0" and "−0.6" are generally used as the values a12, a13, a21, a23, a31 and a32. In this processing system, it is desirable that the values a14, a24 and a34 respectively satisfy the following equations.

$$a14 = 1 - (a11 + a12 + a13)$$

$$a24 = 1 - (a21 + a22 + a23)$$

$$a34 = 1 - (a31 + a32 + a33)$$

As a result of the above matrix calculation, if values of the C2, M2 and Y2 data are equal to or smaller than "0", such values are determined as "0". On the other hand, if these values are equal to or larger than "256", such values are determined as "255".

Subsequently, an under color process means 50 performs under color processes described in the following embodiments.

Figure 10:
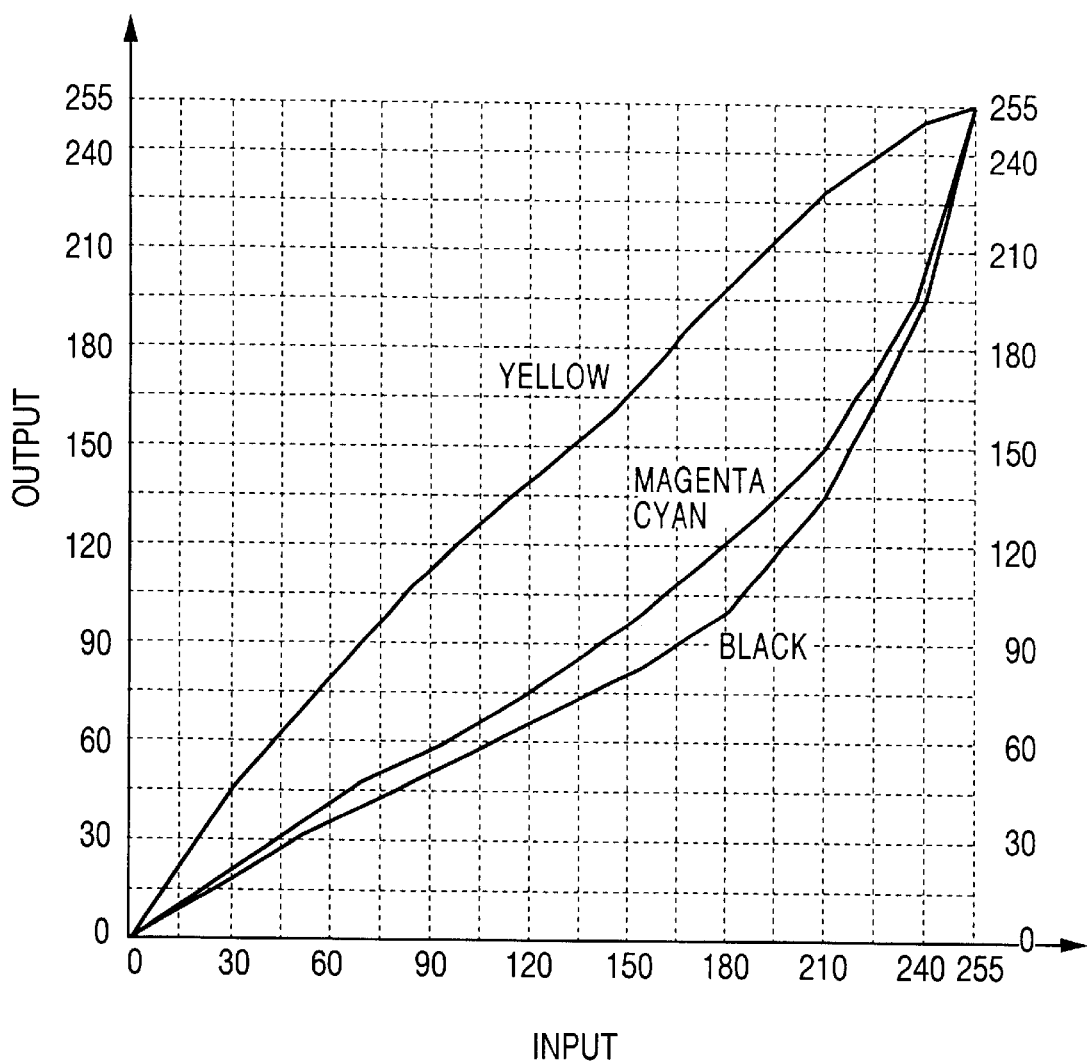
FIG. 10 is a view showing an example of functions in a gamma process.
Figure 11:
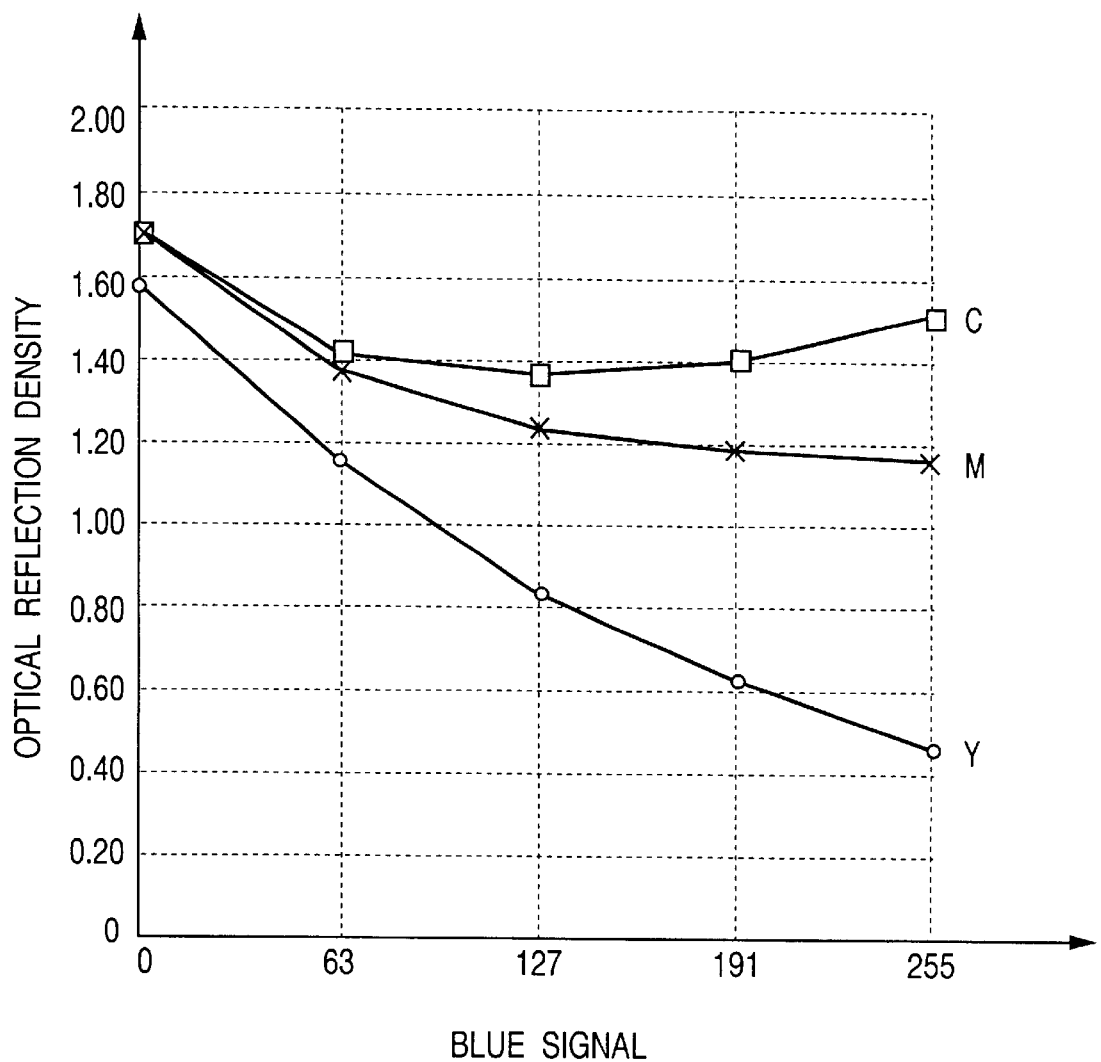
FIG. 11 is a view showing results of a conventional under color process.

A gamma process means 60 performs gamma correction on the inputted values by using the functions KGAM( ), CGAM( ), MGAM( ) and YGAM( ) as shown in FIG. 10, such that the relation between an inputted value and an optical reflection density of a printed result is linearized.

In this case, each of the functions KGAM( ), CGAM( ), MGAM( ) and YGAM( ) consists of 256 reference tables.

Subsequently, a record encode means 70 performs a binarizing process such as a dither process, an error diffusing process or the like.

On the basis of the C, M, Y and K binary data, an ink-jet record means 80 forms an image on a recording medium in an area gradation manner, by using C, M, Y and K coloring agents.

These means described above are controlled by a CPU (central processing unit) 90. The CPU 90 which uses a RAM (random access memory) 92 as a working memory sets a masking coefficient in the masking means 40, the table in the gamma process means 60 and the like, on the basis of programs stored in a ROM (read-only memory) 91.

(First Embodiment)

In the first embodiment, it is improved tonality (or gradient) in gradation from blue to black in which the above-described conventional problem remarkably occurs. Such problem remarkably occurs in the gradation from blue to black because, in a hue circle, lightness in a blue region is lower than that in other color regions and also a lightness difference in the gradation of the blue region is small.

Figure 2:
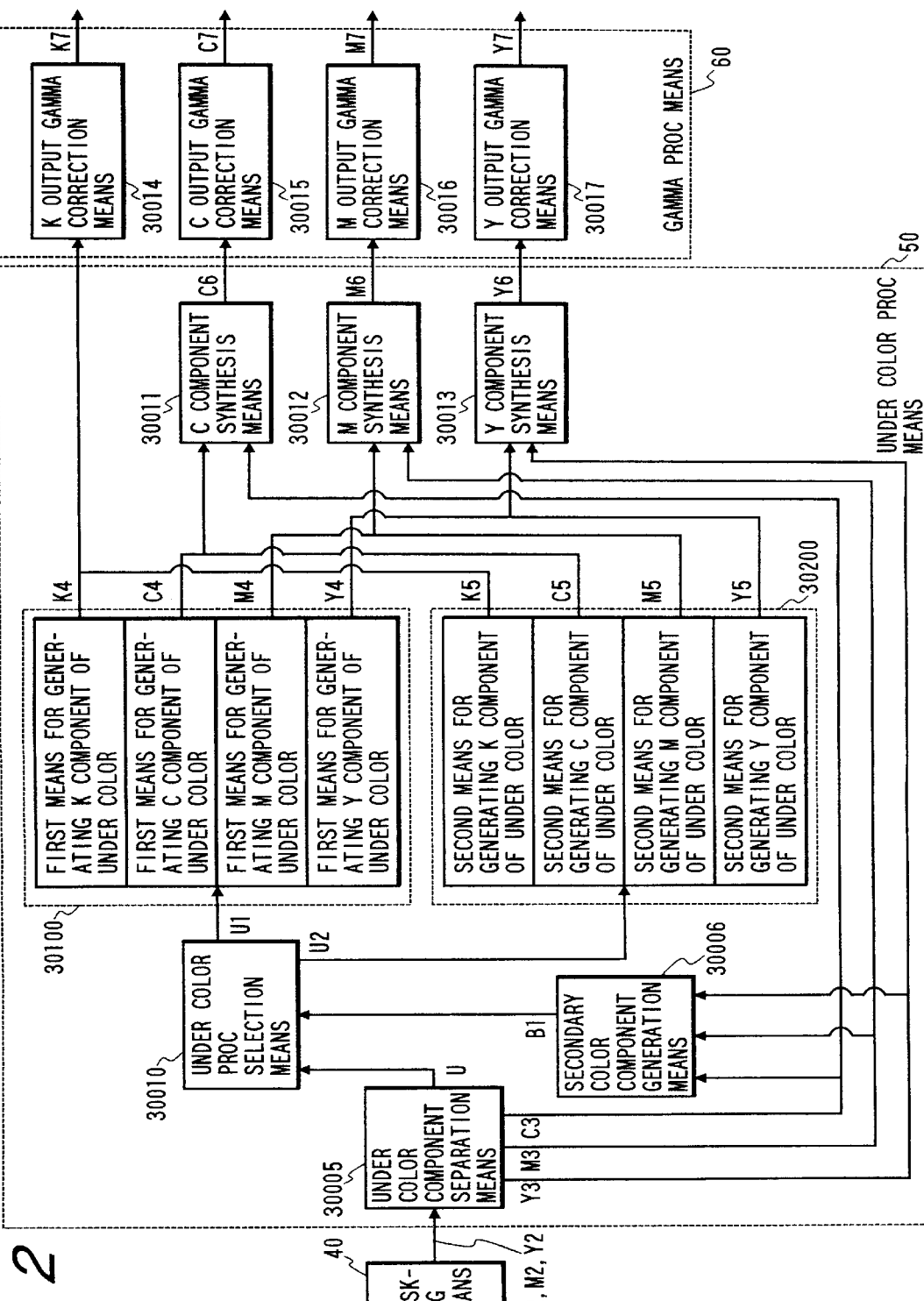
FIG. 2 is a block diagram showing an example of the structure of an under color process means according to a first embodiment of the present invention.
Figure 3:
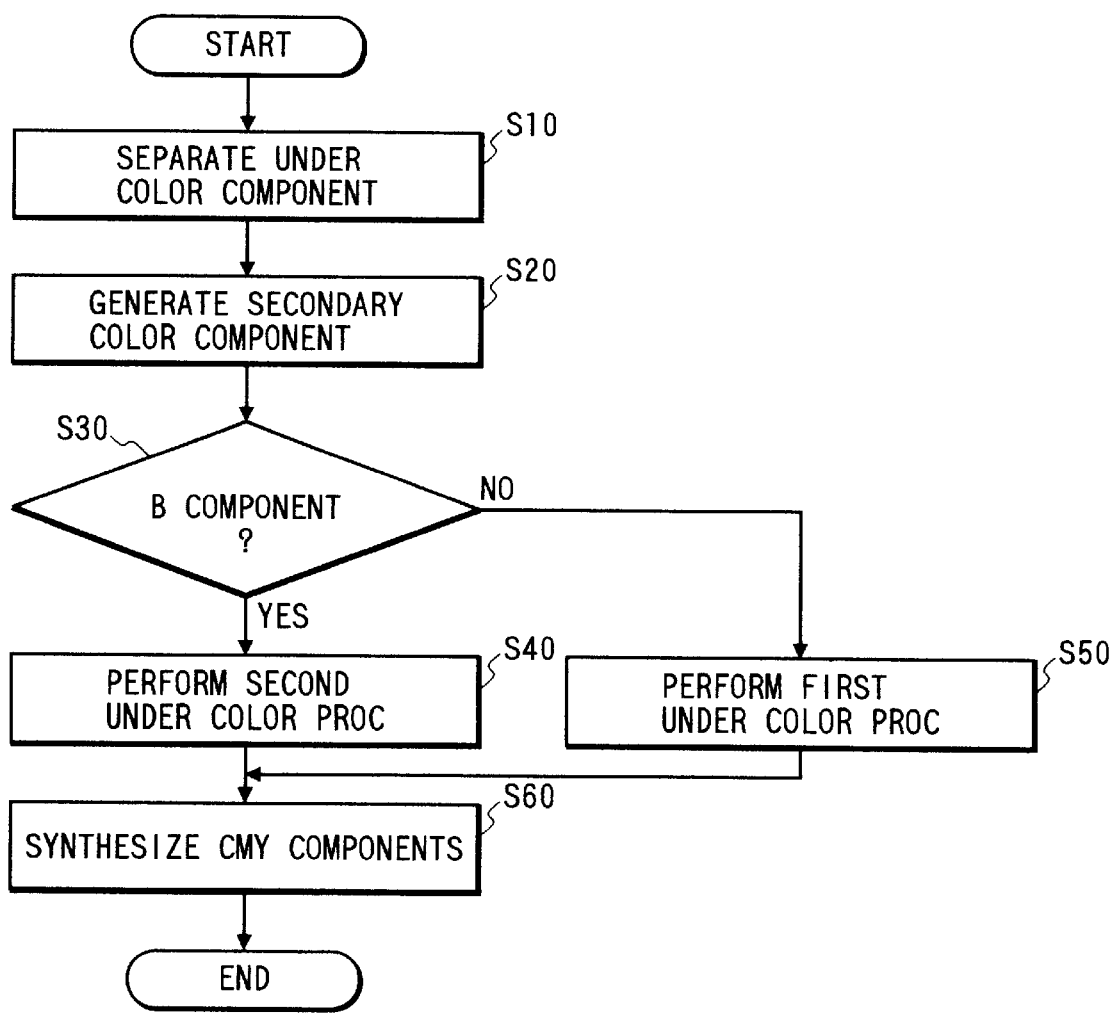
FIG. 3 is a flow chart showing an example of a processing flow in an under color process according to the first embodiment.

FIG. 2 is a block diagram showing an under color process means according to the first embodiment, and FIG. 3 is a flow chart showing a flow of the under color process.

Initially, an under color component separation means 30005 performs a process based on the following equations, to output C3, M3, Y3 and U data (step S10).

$$U = \min(C2, M2, Y2)$$

$$C3 = C2 - U$$

$$M3 = M2 - U$$

$$Y3 = Y2 - U$$

A secondary color component generation means 30006 generates a blue component (i.e., B1 data) from the Y3, M3 and C3 data outputted from the under color component separation means 30005. In this case, it is assumed that under color components of the M3 and C3 data are outputted as the B1 data. Therefore, if a processing function to be used for obtaining the minimum value is min( ), an equation B1=min(M3, C3) is satisfied. For this reason, a blue component in inputted image data is represented by the B1 data consisting of eight bits (step S20).

On the basis of whether or not the blue component (i.e., B1 data) is "0", an under color process selection means 30010 judges whether or not the inputted image data belongs to the blue region in the hue circle, and then selects the under color process means according to a judged result (step S30).

If the B1 data is "0", since the inputted image data does not belong to the blue region, a first under color process means 30100 is selected to be used but a second under color process means 30200 is not used.

The first under color process means 30100 performs the same process as in the conventional under color process means 20100 by using an under color component (i.e., U1 data), to output C4, M4, Y4 and K4 data. In this case, the U1 data satisfies an equation U1=U.

Figure 9:
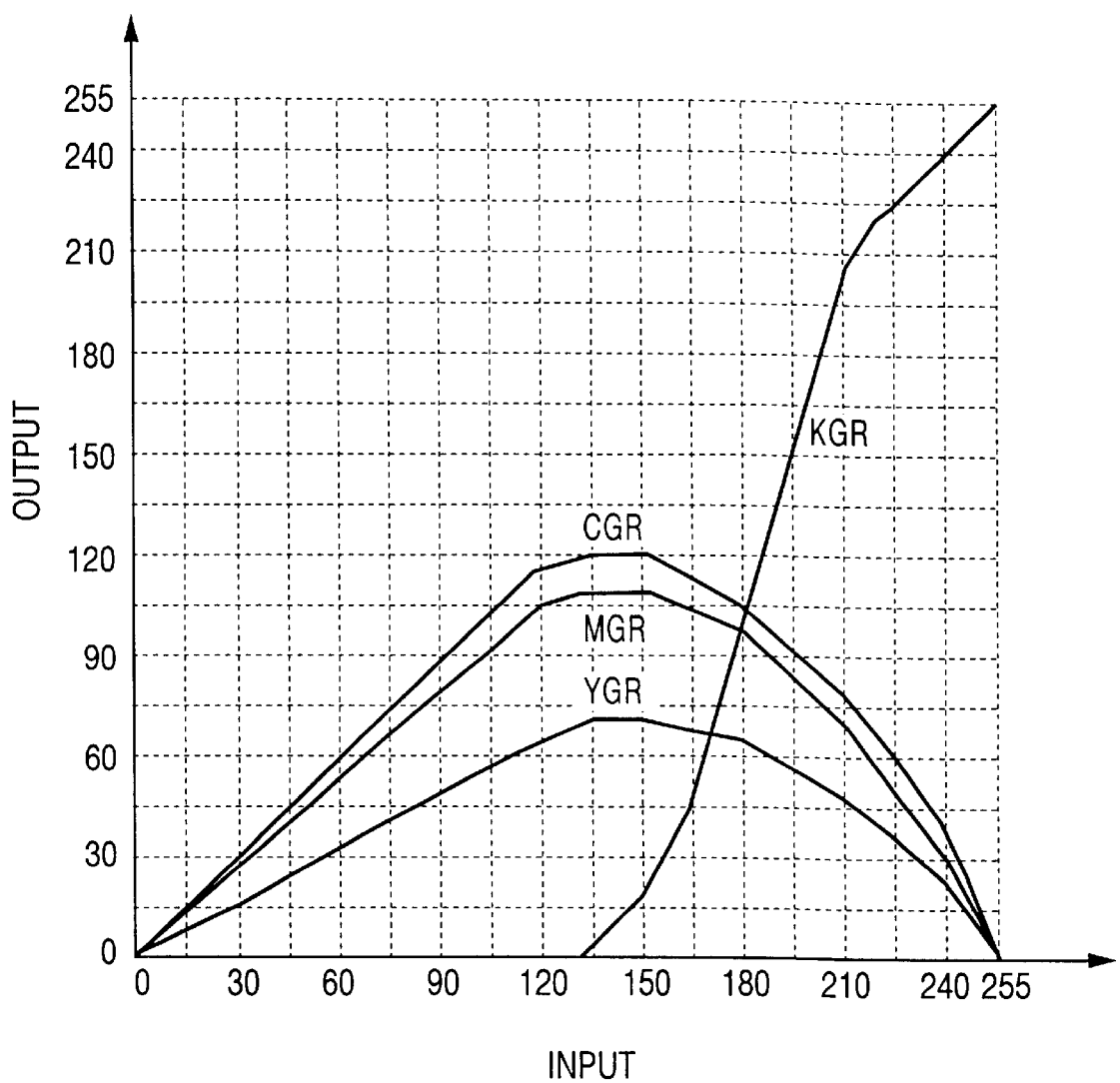
FIG. 9 is a view showing an example of functions in the under color process.

The first under color process means 30100 is composed of a first means for generating a black component, a first means for generating a cyan component, a first means for generating a magenta component and a first means for generating a yellow component. By using the functions KGR( ), CGR( ), MGR( ) and YGR( ) shown in FIG. 9, the first under color process means 30100 generates the C4, M4, Y4 and K4 data each consisting of eight bits on the basis of the following equations (step S40).

$$C4 = CGR(U)$$

$$M4 = MGR(U)$$

$$Y4 = YGR(U)$$

$$K4 = KGR(U)$$

Further, in the case where the B1 data is "0", since the second under color process means 30200 is not used, C5, M5, Y5 and K5 data (or signals) are not outputted.

As described above, in the case where the inputted image data does not belong to the blue region, if the under color process is performed by using the functions CGR( ), MGR( ), YGR( ) and KGR( ) which have been set such that a printed result when the inputted image data satisfies the relation R=G=B becomes an achromatic color, it can be compensated that the printed result comes to have a gray scale when the inputted image data has the gray scale. Further, since the functions are set such that the black component (i.e., K4 data) is "0" in a portion where color components other than the under color component are large and vivid, a tint can be reproduced in high quality in the vivid portion of the region which is other than the blue region and of which lightness in the vivid portion is relatively high.

If the B1 data is larger than "0", since the inputted image data belongs to the blue region, the under color selection means 30010 outputs the under color component U, as U2 data, to the second under color process means 30200. That is, an equation U2=U is satisfied in this case.

Further, in the case where the B1 data is larger than "0", since the first under color process means 30100 is not used, the C4, M4, Y4 and K4 data or signals are not outputted.

The second under color process means 30200 is composed of a second means for generating the black component, a second means for generating the cyan component, a second means for generating the magenta component and a second means for generating the yellow component. By using the functions KGR( ), CGR( ), MGR( ) and YGR( ) used in the first under color process means 30100, functions KGR2( ), CGR2( ), MGR2( ) and YGR2( ) shown in FIG. 5, and a function SFT( ) shown in FIG. 4, the second under color process means 30200 performs following under color processes (step S50).

Each of the functions KGR2( ), CGR2( ) MGR2( ) and YGR2( ) is the function of which input has eight bits and of which output also has eight bits. Further, the function SFT( ) is the function of which input has eight bits but of which output has any one of values within a range "0" to "1".

By using the above functions, the second means for generating the black component calculates $$K5=KGR(U2)\times(1-SFT(U2+B1))+KGR2(U2)\times SFT(U2+B1).$$

The second means for generating the cyan component calculates $$C5=CGR(U2)\times(1-SFT(U2+B1))+CGR2(U2)\times SFT(U2+B1).$$

The second means for generating the magenta component calculates $$M5=MGR(U2)\times(1-SFT(U2+B1))+MGR2(U2)\times SFT(U2+B1).$$

The second means for generating the yellow component calculates $$Y5=YGR(U2)\times(1-SFT(U2+B1))+YGR2(U2)\times SFT(U2+B1).$$

Figure 5:
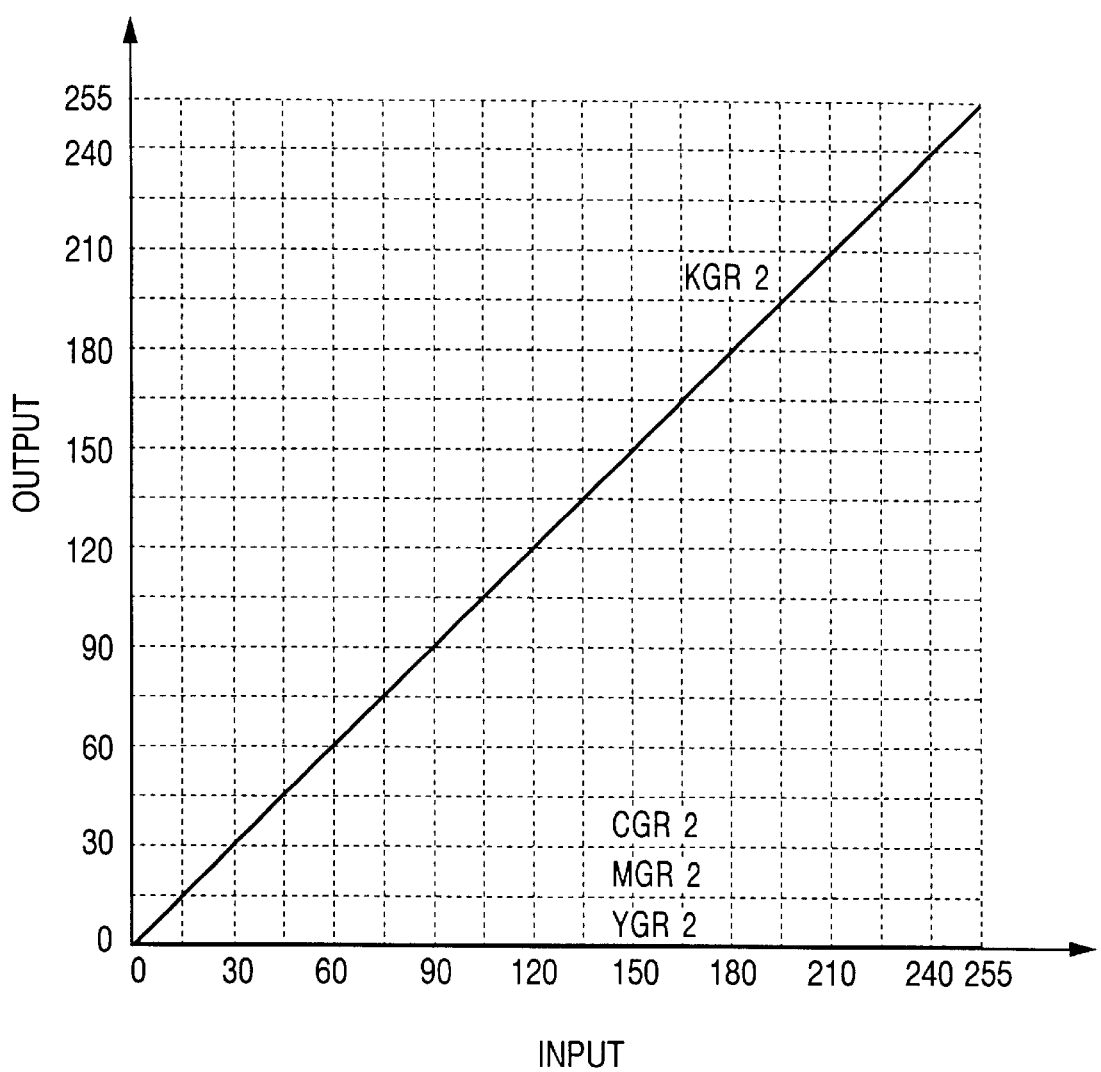
FIG. 5 is a view showing an example of a function KGR2 in the under color process according to the first embodiment.

As described above, in the case where the inputted image data belongs to the blue region, by using the functions KGR2( ), CGR2( ), MGR2( ) and YGR2( ) shown in FIG. 5, the black component (i.e., K data) is generated even when the value of the under color component is low. Therefore, the tonality can be compensated in the portion in which the components other than the under color component are large and of which tonality could not be compensated because of its low lightness. That is, the tonality can be compensated even in the vivid portion.

Figure 6:
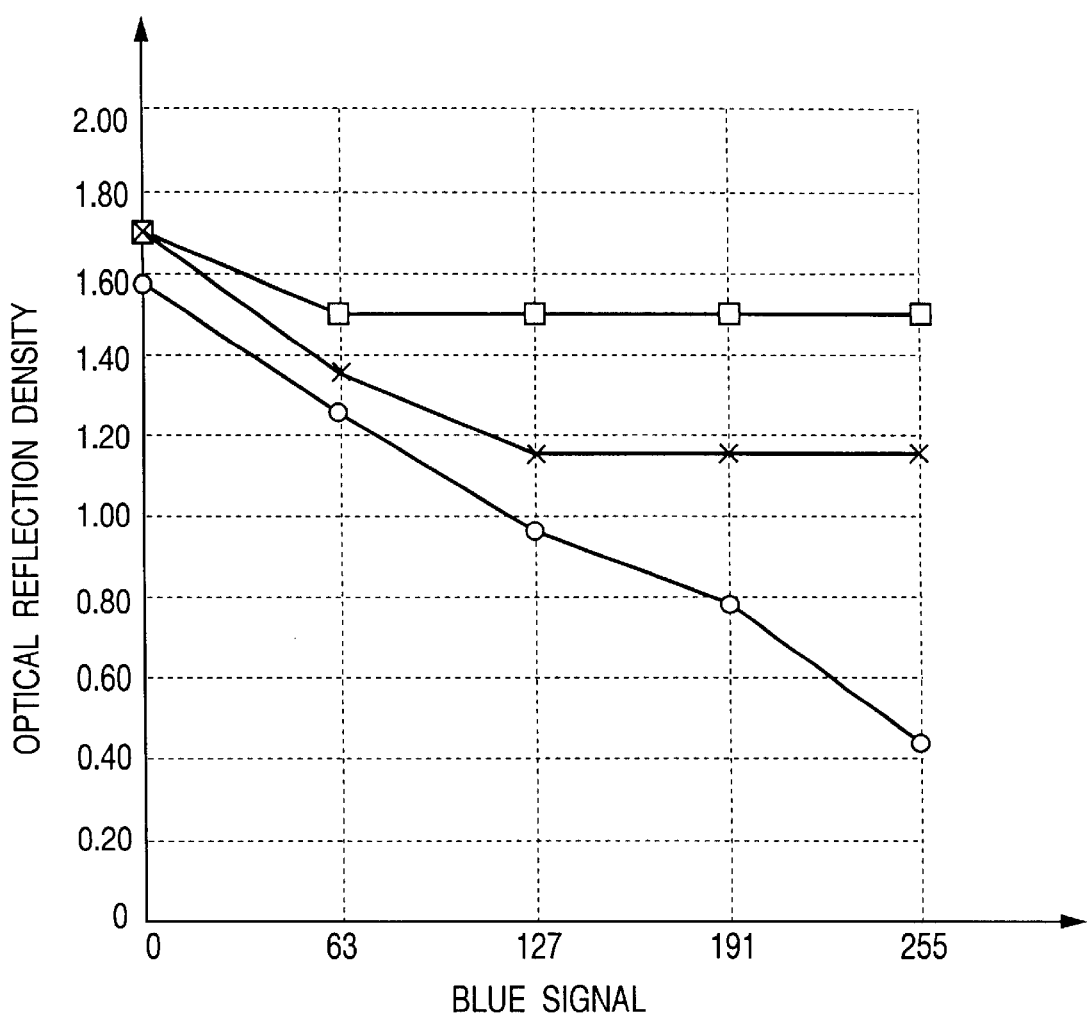
FIG. 6 is a view showing results of the under color process according to the first embodiment.

FIG. 6 is a view showing the relation between a blue signal (B) and an optical reflection density in the present embodiment. As can be seen from FIG. 6, the conventional problem has been solved that, as the blue signal in the cyan component is lowered, the optical reflection density is lowered.

Figure 4:
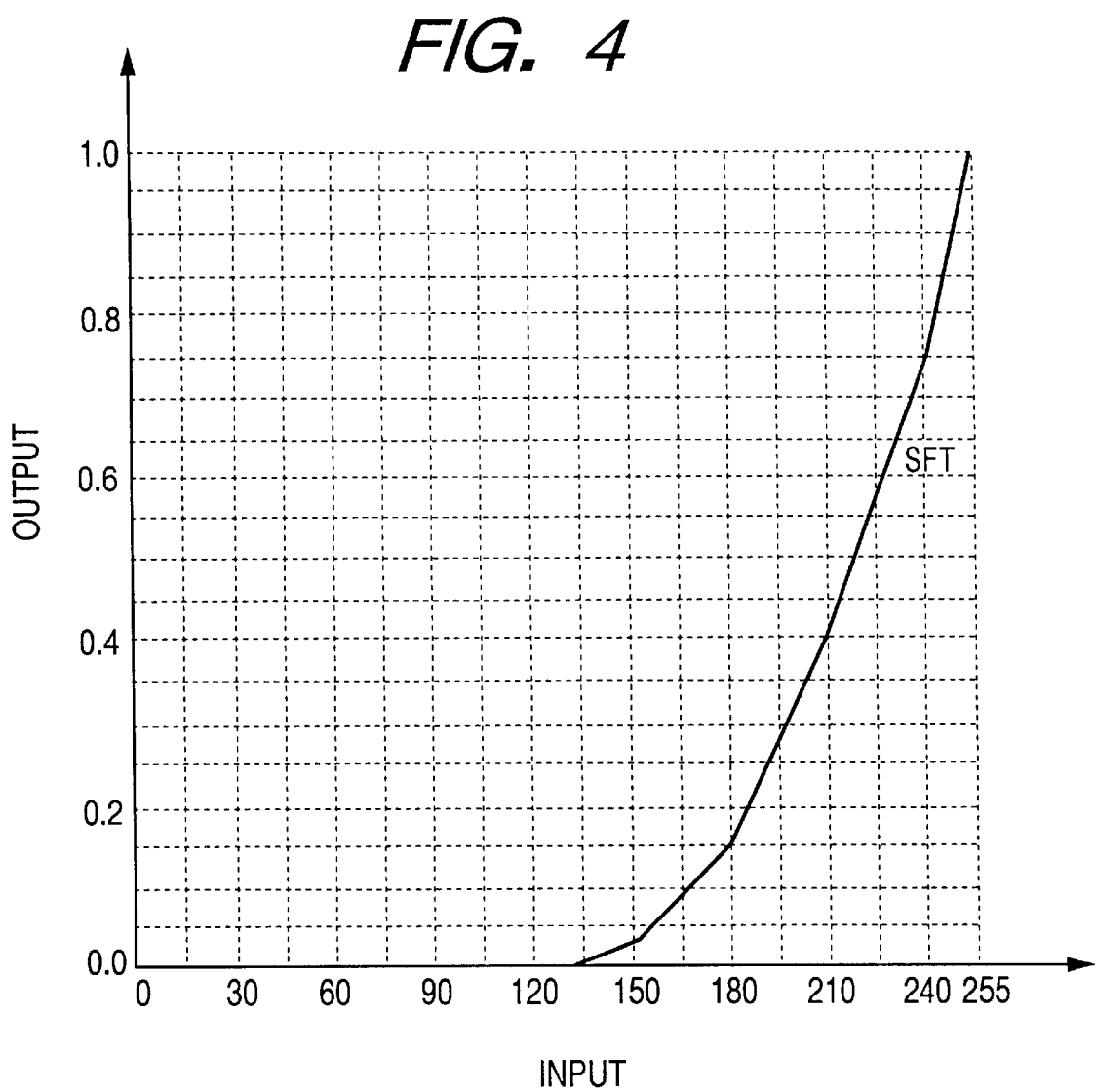
FIG. 4 is a view showing an example of a function SFT in the under color process according to the first embodiment.

Further, as shown in FIG. 4, since the continuous function is used as the SFT function, continuity between adjacent hues can be maintained.

Subsequently, the cyan (C), magenta (M) and yellow (Y) components corresponding to the black (K) component posterior to the under color process are generated on the basis of the C4, M4 and Y4 data generated by the first under color process means 30100 or the C5, M5 and Y5 data generated by the second under color process means 30200 and the components (i.e., chromatic color components) other than the under color component of the inputted image data (step S60).

Then, a cyan component synthesis means 30011 outputs C6 data by calculating C6=C3+(C4+C5).

A magenta component synthesis means 30012 outputs M6 data by calculating M6=M3+(M4+M5).

A yellow component synthesis means 30013 outputs Y6 data by calculating Y6=Y3+(Y4+Y5).

As described above, according to the present embodiment, the tonality in the gradation from blue to black in the blue region (in which the lightness of the vivid portion is low) can be improved without affecting other color regions and as the continuity between the adjacent hue is maintained.

Further, even in the case where the color components other than the under color component are included in the inputted image data, the tonality or gradient can be compensated.

In the present embodiment, the functions to be used in the first and second under color process means are not limited to the above-described functions. That is, it is obviously understood that other functions may be used.

(Second Embodiment)

In the second embodiment, a color space is divided into seven regions; i.e., an achromatic color region; a cyan (C) region, a magenta (M) region and a yellow (Y) region which construct a primary color region; and a red (R) region, a green (G) region and a blue (B) region which construct a secondary color region. Then, an under color process suitable for each color region is performed.

Figure 7:
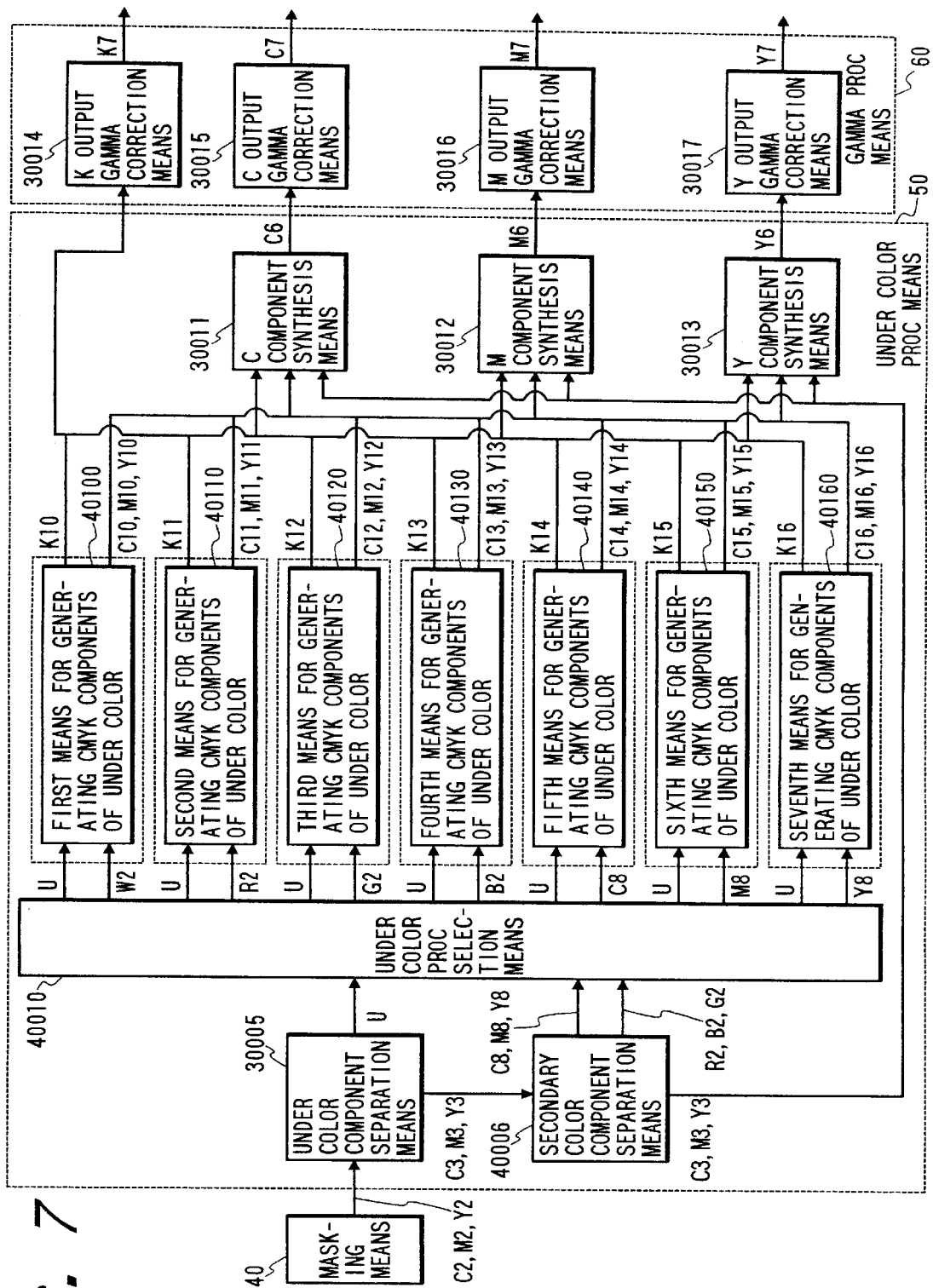
FIG. 7 is a block diagram showing an example of structure of an under color process means according to a second embodiment of the present invention.
Figure 8:
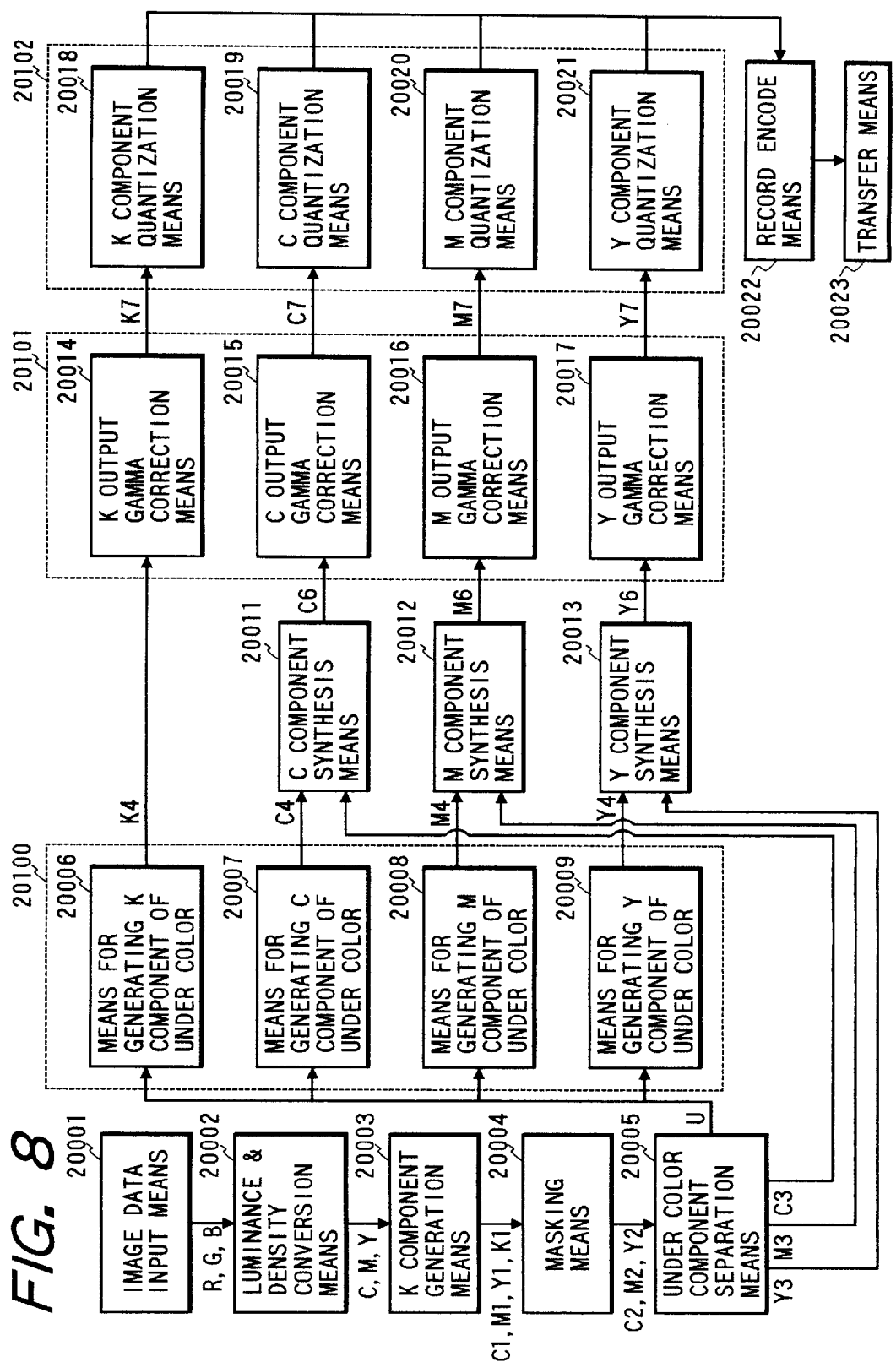
FIG. 8 is a block diagram showing the structure of a conventional image process apparatus.

FIG. 7 is a block diagram showing an example of an under color process means according to the second embodiment. In FIG. 7, the same parts as shown in FIG. 1 according to the first embodiment are added with the same reference numerals, and thus explanations thereof are omitted.

From C3, M3 and Y3 data representing chromatic color components of inputted image data from which an under color component has been eliminated by an under color component separation means 30005, a secondary color component separation means 40006 extracts primary color components (i.e., C8, M8 and Y8 data) and secondary color components (i.e., R2, G2 and B2 data) on the basis of following equations.

$$R2=\min(M3, Y3)$$

$$G2=\min(Y3, C3)$$

$$B2=\min(C3, M3)$$

$$C8=C3-(B2+G2)$$

$$M8=M3-(R2+B2)$$

$$Y8=Y3-(R2+G2)$$

Subsequently, an under color process selection means 40010 judges a color region to which the inputted image data belongs, on the basis of the under color component (i.e., U data) and the primary and secondary color components (i.e., C8, M8, Y8, R2, B2 and G2 data), so as to select the under color process means corresponding to such a judged result. That is, in a case where both the primary and secondary color components are "0", the under color process means judges that the inputted image data belongs to the achromatic color region. On the other hand, in a case where both the primary and secondary color components are not "0", the under color process means judges that the inputted image data belongs to the region of which color component has the largest value. Then, on the basis of such a judged result, the under color process selection means 40010 selects either one of a first means 40100 corresponding to the achromatic color region, a fifth means 40140 corresponding to the C region, a sixth means 40150 corresponding to the M region, a seventh means 40160 corresponding to the Y region, a second means 40110 corresponding to the R region, a third means 40120 corresponding to the G region, and a fourth means 40130 corresponding to the B region.

Hereinafter, the process in the means for generating CMYK color components of each under color will be described.

<first means 40100 for generating CMYK color components of under color>

The first means 40100 performs the under color process suitable for the achromatic color region on the basis of the following equations.

$$W2=255-(U+R2+G2+B2+C8+M8+Y8)$$

$$K10=(W2/(255-U))\times KGR1(U)$$

$$C10=(W2/(255-U))\times CGR1(U)$$

$$M10=(W2/(255-U))\times MGR1(U)$$

$$Y10=(W2/(255-U))\times YGR1(U)$$

<second means 40110 for generating CMYK color components of under color>

The second means 40110 performs the under color process suitable for the R region on the basis of the following equations.

$$K11=(R2/(255-U))\times KGR2(U)$$

$$C11=(R2/(255-U))\times CGR2(U)$$

$$M11=(R2/(255-U))\times MGR2(U)$$

$$Y11=(R2/(255-U))\times YGR2(U)$$

<third means 40120 for generating CMYK color components of under color>

The third means 40120 performs the under color process suitable for the G region on the basis of the following equations.

$$K12=(G2/(255-U))\times KGR3(U)$$

$$C12=(G2/(255-U))\times CGR3(U)$$

$$M12=(G2/(255-U))\times MGR3(U)$$

$$Y12=(G2/(255-U))\times YGR3(U)$$

<fourth means 40130 for generating CMYK color components of under color>

The fourth means 40130 performs the under color process suitable for the B region on the basis of the following equations.

$$K13=(B2/(255-U))\times KGR4(U)$$

$$C13=(B2/(255-U))\times CGR4(U)$$

$$M13=(B2/(255-U))\times MGR4(U)$$

$$Y13=(B2/(255-U))\times YGR4(U)$$

<fifth means 40140 for generating CMYK color components of under color>

The fifth means 40140 performs the under color process suitable for the C region on the basis of the following equations.

$$K14=(C8/(255-U))\times KGR5(U)$$

$$C14=(C8/(255-U))\times CGR5(U)$$

$$M14=(C8/(255-U))\times MGR5(U)$$

$$Y14=(C8/(255-U))\times YGR5(U)$$

<sixth means 40150 for generating CMYK color components of under color>

The sixth means 40150 performs the under color process suitable for the M region on the basis of the following equations.

$$K15=(M8/(255-U))\times KGR6(U)$$

$$C15=(M8/(255-U))\times CGR6(U)$$

$$M15=(M8/(255-U))\times MGR6(U)$$

$$Y15=(M8/(255-U))\times YGR6(U)$$

<seventh means 40160 for generating CMYK color components of under color>

The seventh means 40160 performs the under color process suitable for the Y region on the basis of the following equations.

$$K16=(Y8/(255-U2))\times KGR7(U)$$

$$C16=(Y8/(255-U2))\times CGR7(U)$$

$$M16=(Y8/(255-U2))\times MGR7(U)$$

$$Y16=(Y8/(255-U2))\times YGR7(U)$$

As described above, in the present embodiment, since the functions KGR( ), CGR( ), MGR( ) and YGR( ) are provided for each color region, the under color process suitable for each color region can be performed.

Further, since the under color process is performed according to ratio of a main color component to a range other than the under color component, continuity between adjacent hues can be maintained.

In the above-described second embodiment, it is judged that the inputted image data belongs to the achromatic color region in the case where the primary and secondary color components are "0". However, the achromatic color region may be widened more. That is, for example, in a case where a total value of the primary and secondary color components is equal to or smaller than a predetermined value, it may be judged that the inputted image data belongs to the achromatic color region. According to the above-described under color process in the achromatic color region, the under color process is performed according to ratio of a component (i.e., W2 data) to the range other than the under color component. Therefore, for example, even if the achromatic color region is widened more, the high-quality under color process can be performed.

(Third Embodiment)

The third embodiment is a modification of the above-described second embodiment. That is, in the third embodiment, the under color process which has been used in the means for generating the CMYK color components of the under color corresponding to each color region in the second embodiment is modified as follows.

<under color process in achromatic color region>

$$SW=SET(U)+SFT(R2)+SFT(G2)+SFT(B2)+SFT(C8)+SFT(M8)+SFT(Y8)$$

$$K10=(1-SW)\times KGR1(U)$$

$$C10=(1-SW)\times CGR1(U)$$

$$M10=(1-SW)\times MGR1(U)$$

$$Y10=(1-SW)\times YGR1(U)$$

<under color process in each of chromatic color regions>

$$K\alpha=SFT(A)\times KGR\beta(U2)$$

$$C\alpha=SFT(A)\times CGR\beta(U2)$$

$$M\alpha = SFT(A) \times MGR\beta(U2)$$

$$Y\alpha = SFT(A) \times YGR\beta(U2)$$

In the third embodiment, the reference symbol A denotes a value of a main color component. Further, like the second embodiment, the functions KGRβ( ), CGRβ( ), MGRβ( ) and YGRβ( ) are prepared for each color region.

According to the third embodiment, since the under color process is performed by using the function SFT( ), the relation of under color process between adjacent hue can be arbitrarily set by setting the function SFT( ).

On the other hand, in the third embodiment, the function SFT( ) may be set for each color region.

(Other Modifications)

In the above-described embodiments, the under color process means has performed calculations for each pixel. However, the present invention is not limited to such embodiments. That is, by previously storing the relation between input and output based on such the calculations in the form of a table, the under color process may be performed by using such table.

Further, in the above-described embodiments, the C, M, Y and K coloring agents have been used as the coloring agents used in the ink-jet record means. However, the present invention is not limited to such embodiments. That is, e.g., coloring agents corresponding to specific colors such as B (blue), V (violet) and the like may be used. In this case, the color region may be divided based on the used coloring agents, and the function used in the under color process corresponding to such the color region may be set based on the characteristic of the used coloring agent.

The present invention can be applied to a system constructed by a plurality of equipments (e.g., host computer, interface equipment, reader, printer and the like) or can also be applied to an apparatus comprising a single equipment (e.g., copy machine, facsimile machine).

The invention employed by a method whereby program codes of software to realize the functions of the above-described embodiments are supplied to a computer in an apparatus or a system connected to various devices so as to make the devices operative in order to realize the functions of the above-described embodiments and thus the various devices are operated in accordance with the programs stored in the computer (CPU or MPU) of the system or apparatus is also included in the scope of the present invention.

In such a case, the program codes themselves of the software realize the functions of the above-described embodiments, and the program codes themselves and means for supplying the program codes to the computer, e.g., a memory medium in which the program codes have been stored, construct the present invention.

As such memory medium to store the program codes, e.g., it is possible to use a floppy disk, a hard disk, an optical disk, a magneto-optical disk, a CD-ROM, a magnetic tape, a nonvolatile memory card, a ROM or the like.

It will be obviously understood that the program codes are included in the embodiments of the present invention, even not only in a case where the functions of the above-described embodiments are realized by executing the supplied program codes by the computer but also a case where the functions of the above-described embodiments are realized in cooperation with the OS (operating system) by which the program codes operate in the computer or another application software or the like.

Further, it will also be obviously understood that the present invention also incorporates a case where the supplied program codes are stored in a memory provided for a function expansion board of a computer or a function expansion unit connected to a computer and, after that, a CPU or the like provided for the function expansion board or the function expansion unit executes a part or all of the actual processes on the basis of instructions of the program codes, and the functions of the above-described embodiments are realized by the processes.

Although the present invention has been described above with respect to the preferred embodiments, the present invention is not limited to the above-described embodiments but many modifications and variations are possible with the spirit and scope of the appended claims.

What is claimed is:

1. An image processing method for an image process of converting input color data that does not include a black component to output color data, and controlling a generation process of the black component of the output color data according to a color region to which the input color data belongs, said method comprising:

an input step of inputting color data composed of a plurality of color components that do not include the black color component;

a step of providing a process condition for each of a plurality of color regions;

a step of extracting an under color component from the color data and removing the under color component from the plurality of color components;

a judgment step of judging a color region to which the color data belongs, according to the plurality of color components which have the under color removed; and a processing step of generating a black component by using the process condition according to the judged color region, wherein said processing step uses different process conditions in a blue color region and a yellow color region respectively, and wherein said processing step generates, in the blue color region, the black component in the under color of a low level at which the black component is not generated in the yellow color region.

2. A method according to claim 1, wherein the image information is executed by using an ink-jet record unit.

3. A method according to claim 1, wherein the color region includes an achromatic color region, a red region, a green region, a blue region, a cyan region, a magenta region and a yellow region.

4. A method according to claim 1, wherein the image processing method is executed by using a table.

5. An image processing apparatus for an image process for converting input color data that does not include a black component to output color data, and controlling a generation process of the black component of the output color data according to a color region to which the input color data belongs, comprising;

input means for inputting color data composed of a plurality of color components that do not include the black color component;

means for providing a process condition for each of a plurality of color regions;

means for extracting an under color component from the color data and removing the under color component from the plurality of color components;

judgment means for judging a color region to which the color data belongs, according to the plurality of color components which have the under color removed;

processing means for generating a black component by using the process condition according to the judged color region, wherein said processing means uses different process conditions in a blue color region and a yellow color region respectively, and wherein said processing means generates, in the blue color region, the black component in the under color of a low level at which the black component is not generated in the yellow color region.

6. A recording medium which stores a program for an image process method for an image process of converting input color data that does not include a black component to output color data, and controlling a generation process of the black component of the output color data according to a color region to which the input color data belongs, comprising:

an input step of inputting color data composed of a plurality of color components that do not include the black color component;

a step of inputting color data composed of a plurality of color components that do not include the black color component;

a step of providing a process condition for each of a plurality of color regions;

a step of extracting an under color component from the color data and removing the under color component from the plurality of color components;

a judgment step of judging a color region to which the color data belongs, according to the plurality of color components which have the under color removed; and a processing step of generating a black component by using the process condition according to the judged color region, wherein said processing step uses different process conditions in a blue color region and a yellow color region respectively, and wherein said processing step generates, in the blue color region, the black component in the under color of a low level at which the black component is not generated in the yellow color region.

7. An image process method of executing an under color process of converting input color data that does not include a black component to output color data, said method comprising:

an input step of inputting image data; and an under color process step of executing an under color process for the image data, wherein said under color process step uses different process conditions in a blue color region and a yellow color region respectively, and wherein said under color process step generates, in the blue color region, the black component in the under color of a low level at which the black component is not generated in the yellow color region.

8. A method according to claim 7, wherein, in said under color process step, the under color process is performed on the blue region such that continuity between the blue region and other color regions is not lost.

9. A method according to claim 7, wherein image formation is executed by using an ink-jet record unit.

10. A method according to claim 7, wherein the under color process is performed by using a table.

11. An image processing apparatus for executing an under color process of converting input color data that does not include a black component to output color data, comprising:

an input means for inputting image data; and an under color process means for executing an under color process for the image data, wherein said under color process means uses different process conditions in a blue color region and a yellow color region respectively, and wherein said under color process means generates, in the blue color region, the black component in the under color of a low level at which the black component is not generated in the yellow color region.

12. A recording medium which stores a program for an image process method of executing an under color process of converting input color data that does not include a black component to output color data, said method comprising:

an input step of inputting image data; and an under color process step of executing an under color process for the image data, wherein said under color process step uses different process conditions in a blue color region and a yellow color region respectively, and wherein said under color process step generates, in the blue color region, the black component in the under color of a low level at which the black component is not generated in the yellow color region.

13. A computer program product embodying a program for an image processing method of executing an under color process of converting input color data that does not include a black component to output color data, said program product comprising:

program code for an input step of inputting image data;

program code for an under color process step of executing an under color process for the image data, wherein said program code for said under color process step uses different process conditions in a blue color region and a yellow color region respectively, and wherein said program code for said under color process step generates, in the blue color region, the black component in the under color of a low level at which the black component is not generated in the yellow color region.

* * * * *